No. 852,194. PATENTED APR. 30, 1907.
E. T. ODOM.
CHOPPER AND CULTIVATOR.
APPLICATION FILED MAY 12, 1906.
3 SHEETS—SHEET 1.
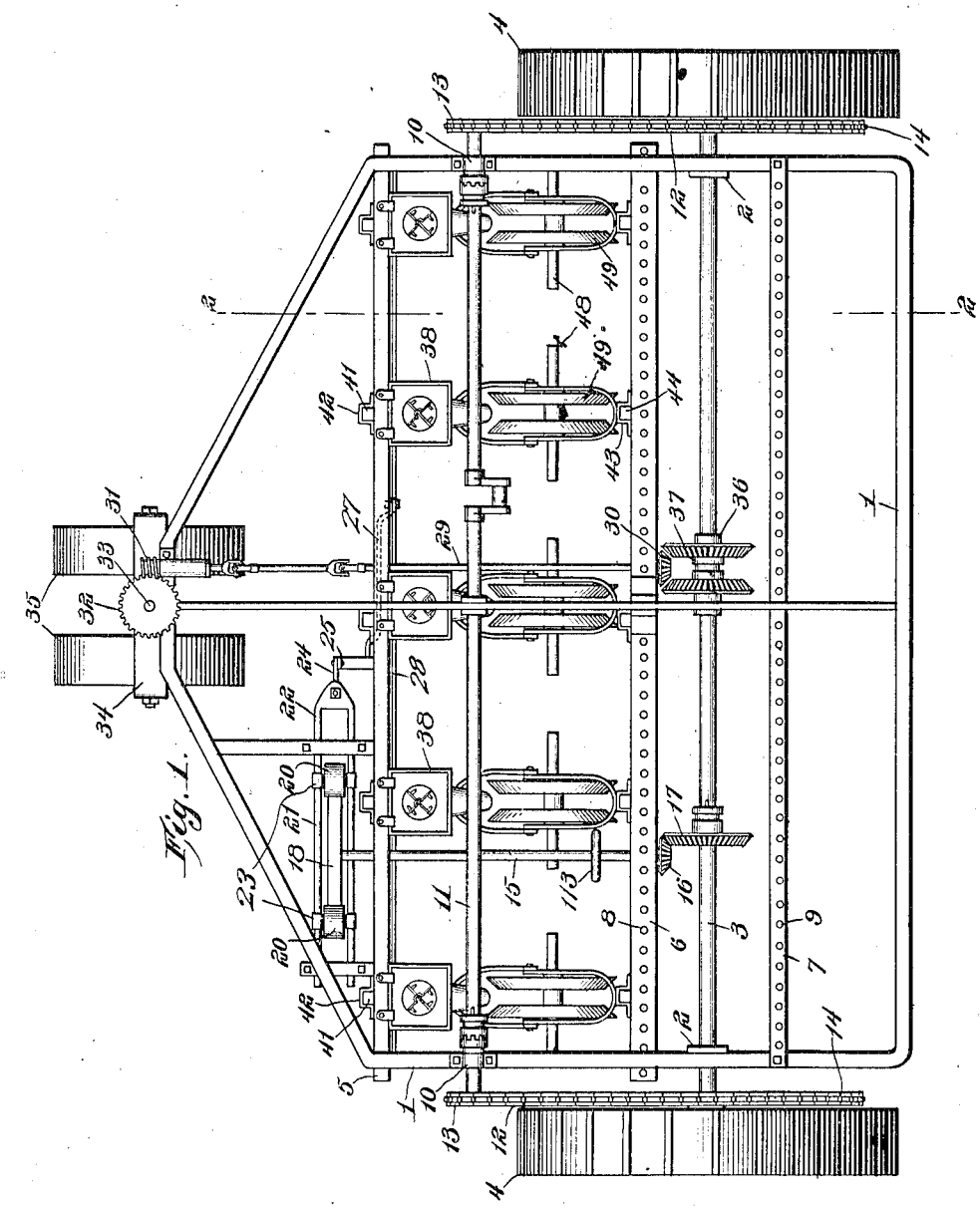
Witnesses
Louis R. Heinrichs
F. S. Elmore
Inventor
Elbert T. Odom
By Victor J. Evans
Attorney No. 852,194. PATENTED APR. 30, 1907.
E. T. ODOM.
CHOPPER AND CULTIVATOR.
APPLICATION FILED MAY 12, 1906.
3 SHEETS—SHEET 2.
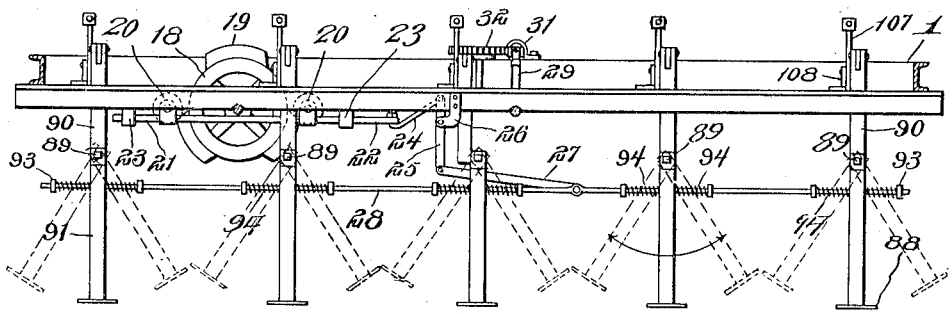
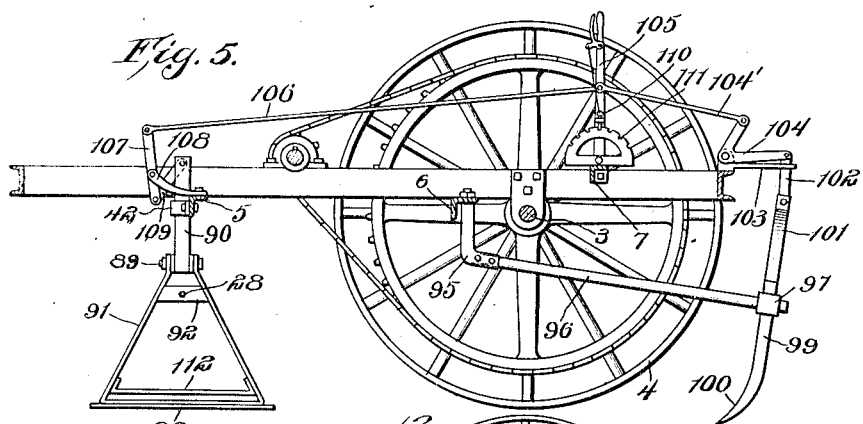
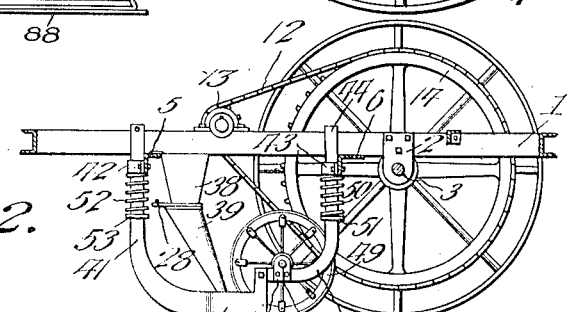
Witnesses.
Louis R. Heinrichs
F. S. Elmore
Inventor
Elbert T. Odom
By Victor J. Evans
Attorney

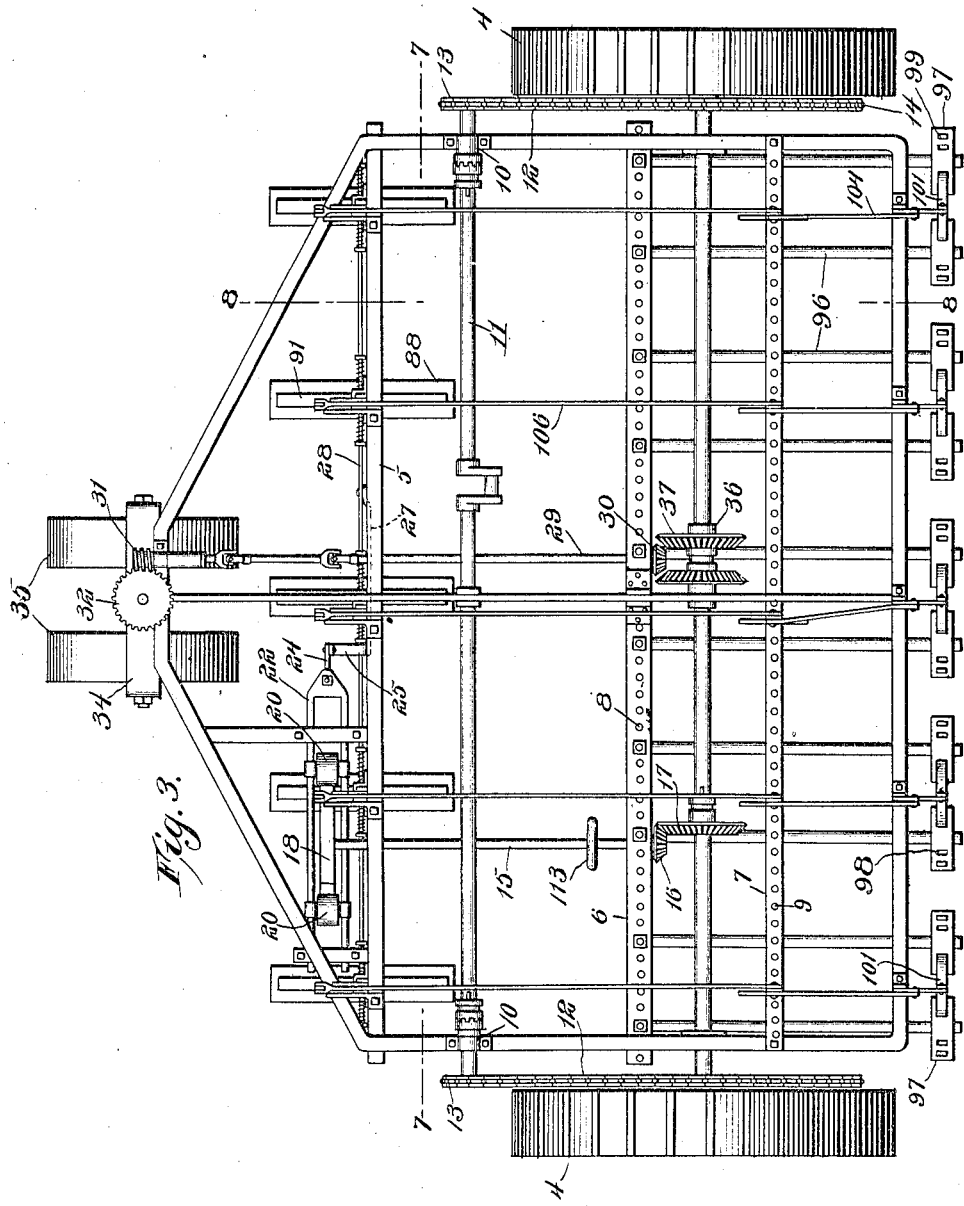

UNITED STATES PATENT OFFICE.

ELBERT T. ODOM, OF SHERMAN, TEXAS.

CHOPPER AND CULTIVATOR.

No. 852,194.          Specification of Letters Patent.          Patented April 30, 1907.

Application filed May 12, 1906. Serial No. 316,577.

*To all whom it may concern:*

Be it known that I, ELBERT T. ODOM, a citizen of the United States, residing at Sherman, in the county of Grayson and State of Texas, have invented new and useful Improvements in Choppers and Cultivators, of which the following is a specification.

This invention relates to agricultural implements, being designed especially for use in planting and cultivating operations and embodies in its organization a reciprocatory actuating member or rod adapted to be operated by a suitable mechanism during the travel of the machine over the ground and in turn to operate movable devices either in the form of cultivating blades or dropper plates with which the rod may, in practice, be connected.

The invention has for its objects to provide a comparatively simple, inexpensive machine of this character of compact form in which the movable devices operated by the rod may be readily interchanged for adaptation in the planting and cultivating operations, one wherein the cultivating rod will be positively driven for effectively operating said devices, and one in which the rod operating mechanism may be thrown out of action at will.

With these and other objects in view the invention comprises the novel features of construction and combination of parts more fully hereinafter described.

In the accompanying drawings: Figure 1 is a top plan view of the machine embodying the invention and showing the same equipped with seed planting mechanism. Fig. 2 is a vertical, longitudinal section taken on the line 2—2 of Fig. 1. Fig. 3 is a view similar to Fig. 1, showing the machine equipped with cultivating devices embodied in the invention. Fig. 4 is a detail, vertical transverse section taken on the line 7—7 of Fig. 3. Fig. 5 is a vertical, longitudinal section taken on the line 8—8 of Fig. 3.

Referring to the drawings, it will be seen that the main frame of the machine comprises a substantially rectangular frame member 1 preferably composed of channel iron bent into shape and having bearings 2 for a shaft or axle 3 on which is fixed transporting wheels 4, there being fixed in the frame 1 a plurality of transversely extending frame members or bars 5, 6, 7, preferably positioned as shown and composed of angle iron and of which the bars 6 and 7 are provided with perforations 8 and 9, respectively, arranged at uniformly spaced intervals throughout the entire length of the respective bars, while journaled in suitable bearings 10 in the frame is a drive shaft 11 adapted for operation by a suitable motor, not shown, and connected with and for operating the shaft 3 through the medium of sprocket chains 12 engaged with sprocket pinions 13 on the shaft 11 and with sprocket gears 14 fixed on the shaft 3.

Arranged counter to the shaft 3 and journaled in suitable bearings in the frame is a rotary cam shaft 15 provided at its rear end with a bevel pinion 16 in mesh with a gear 17 carried by the shaft 3 and having at its forward end a cam member or wheel 18 provided with a plurality of relatively spaced, segmental cam portions 19 detachably secured in any appropriate manner to the wheel 18 which is arranged for rotation between a pair of antifriction rollers 20 journaled in suitable bearings between the side portions or arms 21 of a reciprocatory member or slide 22 supported for longitudinal movements in bearings 23 on the frame and having its forward end connected by a link 24 with the upper end of a vertical rocking member or lever 25 pivoted between its ends in a bracket 26 and having its lower end in turn connected by a link 27 with a reciprocatory actuating member or rod 28 extended transversely of the frame and sustained by suitable bearings, said rod being connected for operating the movable dropping devices or cultivating devices, as more fully hereinafter explained. It will be understood in this connection that the gear 17 is adapted for movement longitudinally of the shaft 3 for engagement or non-engagement with the pinion 16, thus to control at will the operation of cam shaft 15, and further that the number and size of the cam portions 19 may be varied for regulating the speed of movement and number of strokes of the slide member 22, thus to govern the devices operated by the actuating rod 28.

Extended longitudinally of the frame and counter to the shaft 3 is a steering shaft 29 equipped at its rear end with a bevel pinion 30 and at its forward end with a worm 31 in mesh with a worm gear 32 fixed upon the upper end of a vertical post or standard 33 journaled in suitable bearings at the front of the frame and carrying a fork 34 in which is mounted a pair of steering wheels 35 which sustain the front of the machine, there being slidably mounted upon the shaft 3 and for rotation therewith a sleeve 36 adapted for operation by a suitable controlling lever and carrying a pair of relatively spaced clutch heads 37 in the form of bevel gears which may be brought independently into engagement with the pinion 30 for imparting motion to the steering shaft 29. It is apparent that when one of the gears 37 is engaged with the pinion the shaft 29 will be driven in one direction for operation through the medium of worm 31 and gear 32 to turn the steering wheels 35 to the right or left, as the case may be, while the engagement of the other gear 37 with the pinion effects a reverse movement of the parts for reversing the movement of the steering wheels in properly guiding the machine over the ground.

In Figs. 1 and 2, which show the machine in its adaptation for use as a planter, there are attached to the frame bar 5 a plurality of seed boxes or hoppers 38 of the usual or any appropriate form containing rotary, oscillatory dropper plates 38' connected with and for movement by the rod 28, while attached to each of the boxes is a downwardly and rearwardly inclined discharge spout or duct 39 having its lower end arranged for delivery into the bifurcated rear portion of a furrow opening member or runner 40 terminating at its forward end in a vertical portion or shank 41 arranged for vertical movement in a bearing member or clip 42 attached to the bar 5 at a point in line with the center of the adjacent hopper 38, there being arranged for vertical movement in bearing members of straps 43 attached to the frame bar 6 a plurality of vertical standards 44 corresponding in number to the number of runners 40 and each terminating at its lower end in a forwardly extending horizontal portion or fork 45 connected at 46 to the rear end of the adjacent runner, as seen more clearly in Fig. 2.

Journaled in suitable bearings 47 provided on the fork 45 is a shaft or axle 48 carrying a pair of spaced coverer wheels or disks 49, the rims of which are inclined in relatively reverse directions, as shown, and for throwing the dirt toward the furrow, there being coiled upon each of the standards 44 a normally expanded spring 50 having bearing at its upper end against the clip 43 and at its lower end against a collar 51, while arranged on each of the stems 41 is a corresponding spring 52 disposed to bear at its upper end against the clip 42 and at its lower end against a collar 53 fixed on the stem. In action, the springs 50 and 52 serve to hold the runners and covering wheels down to their work, but are adapted to yield for permitting said parts to freely override stones or other obstructions, it being noted in this connection that the runners, together with their companion follower wheels, are susceptible of vertical movement independently of each other.

In practice, as the machine advances over the ground, motion will be transmitted from axle 3 to shaft 15 through the medium of the gear connections and during rotation of the shaft 15 the slide member 22 will be reciprocated through the medium of the cam wheel 18 and coöperating rollers, it being noted in this connection that as the wheel 18 revolves the segmental cam portions 19 will act upon said rollers for positively moving the slide back and forth. During reciprocation of the slide the lever 25 will be rocked and will, through the link connection 27, reciprocate rod 28 which in turn, operates the movable devices connected therewith, it being understood that the repeated movement of the slide 22 and consequently the intervals of operation of the movable devices may be varied at will by varying the number and sizes of the cam portions 19, as heretofore explained, and further that the mechanism may be thrown out of action at will by moving the gear 17 longitudinally of the axle 3 and to position for non-engagement with the pinion 16, as will be readily understood.

As seen in Figs. 3, 4 and 5, the machine is equipped with movable devices in the form of cultivating or chopping blades 88 which are substituted for the movable dropper devices 55 to be operated by the actuating rod 28, these blades, which are of substantially A-form in side elevation, being each pivoted at 89 and for vertical swinging movement on the lower end of a post or standard 90 slidably disposed in one of the clip bearings 42 and having fixed between its side portions 91 a bearing piece or web 92 in which the rod 28 has bearing, while arranged on the rod 28 and to bear at their outer ends against stop collars 93 are pairs of normally expanded pressure springs 94, the springs of each pair being disposed respectively on opposite sides of one of the blades and to bear at their inner ends against the adjacent web 92, for a purpose which will presently appear.

Fixed at their upper ends in the openings 8 of bar 6 are vertically depending bearing pieces 95 carrying rearwardly projecting arms 96 equipped at their rear ends with heads 97 having bearing openings 98, in which are slidably disposed the stems or shanks 99 of cultivating blades or hoes 100 arranged in pairs, as seen in Fig. 3, and connected in such order by arched members or straps 101 adapted to straddle the respective rows of plants, there being pivoted to the upper end of each arched member a link 102 slidable through an opening in a bearing arm 103 carried on the rear bar of the frame to which is pivoted a bell crank lever 104 having one of its arms engaged with the upper end of the adjacent link 102 and its other arm connected by a link 104 with an actuating lever 105 which is also connected by a link 106 with a rocking lever 107 pivoted in a bearing arm 108 fixed on the bar 5 and having its lower end connected by a link 109 with the upper end of the adjacent standard 90, it being understood that the levers 105 correspond in number to the number of chopping blades 88 and hoes 100 and that each of the levers is adapted for manipulation to raise or lower the corresponding pair or set of blades 88 and 100.

The levers 105 which are attached to the bar 7 by engaging their lower ends through suitable ones of the perforations 9 are provided with locking dogs 110 of usual form and adapted for engagement with toothed segmental racks 111 secured to the bar 7 by fastening members or bolts entered through the openings 9. It will be observed that by providing the openings 8 and 9 at spaced intervals throughout the entire length of the respective bars 6, 7, the blades 100, together with the operating levers 105, may be properly adjusted toward and from each other in a direction transversely of the machine.

Fixed in each of the blades 88 directly above its active cutting portion and extended parallel with the latter is a bar or web 112 which catches the grass or other material chopped by the blade and positively sweeps it out of and to the side of the row through which the blade swings.

It is apparent that during the reciprocation of bar 28 in the manner heretofore explained, the blades 88 will swing on their pivots 89 back and forth through the row of plants in the direction indicated by the double arrow in Fig. 4, it being understood that the blades normally stand in one or the other of the dotted line positions indicated in said figure, thus to prevent them from coming in contact with and injuring the plants during the advancing movement of the machine. Furthermore, it will be understood that in the operation of the machine the movement of the blades 88 is so timed that they will sweep through the rows between the hills or stands of plants for chopping out weeds, grass and the like, and that owing to the blades being adapted for substitution for the dropper plates and to be operated by the same mechanism which actuates the latter, the proper movement of the blades through the row and relative to the hills, is insured.

Fixed on the cam shaft 15 at a point adjacent its rear end is a hand wheel 113 by which the shaft may, after moving the gear 17 longitudinally of shaft 3 for disengagement with pinion 16, be manually turned for properly adjusting the blades 88 and their operating mechanism relative to the first hill or stand of plants, or in other words for so setting the blades that they will, in operation, swing through the rows at the proper intervals between the plants.

Having thus described my invention, what I claim is:

1. In a machine of the type described, a main frame, a rotary power shaft, a reciprocatory actuating rod sustained in the frame, a slide member connected with the rod and provided with spaced abutments, a rotary cam shaft having a head provided with a cam portion adapted to act on the abutments for reciprocating the slide member, operative connections between the power shaft and cam shaft, and movable devices connected for operation by the actuating rod.

2. In a machine of the type described, a main frame, a rotary power shaft mounted therein, a reciprocatory actuating rod sustained in the frame, movable devices connected for operation by the rod, intermediate operative connections between the shaft and rod for actuating the latter, and means included in said connections for moving the rod at regular predetermined intervals.

3. In a machine of the type described, a main frame, a rotary power shaft mounted therein, a reciprocatory actuating rod sustained in the frame, movable devices connected for actuation by the rod, a slide member mounted in the frame and operatively connected with the rod, spaced rotary abutments provided on the slide member, a rotary head arranged between the abutments and having a cam portion adapted to act thereon for reciprocating the slide, and operative connections between the head and power shaft.

4. In a machine of the type described, a frame, a rotary power shaft mounted therein, a reciprocatory actuating rod sustained in the frame, a slide member mounted in the frame and operatively connected with the rod, said slide having a pair of side portions, rollers journaled in spaced relation between the guide portions, a cam shaft journaled in the frame and operatively connected with the power shaft, a head carried for rotation with the cam shaft and arranged between said rollers, said head being provided with a cam portion adapted to act on the rollers for reciprocating the slide, and movable devices connected for operation by the actuating rod.

In testimony whereof, I affix my signature in presence of two witnesses.

ELBERT T. ODOM.

Witnesses:
JOHN L. FLETCHER,
FABIUS S. ELMORE.